United States Patent [19]

Sato

[11] Patent Number: 4,838,976
[45] Date of Patent: Jun. 13, 1989

[54] METHOD FOR MANUFACTURING A STEERING WHEEL

[75] Inventor: Kenji Sato, Aichi, Japan

[73] Assignee: Toyoda Gosei Co., Ltd., Nishikasugai, Japan

[21] Appl. No.: 62,780

[22] Filed: Jun. 15, 1987

[30] Foreign Application Priority Data

Aug. 30, 1986 [JP] Japan .................... 61-204910
Aug. 30, 1986 [JP] Japan .................... 61-204911

[51] Int. Cl.⁴ .................................... B29C 45/14
[52] U.S. Cl. .................... 156/245; 156/272.2; 156/273.3; 74/552; 74/558; 74/558.5; 427/207.1; 427/208.2; 427/301; 427/302; 427/314; 427/318
[58] Field of Search ............ 156/245, 330.9, 331.1, 156/331.3, 272.2, 273.3; 427/207.1, 327, 372.2, 407.1, 409, 435, 444, 54.1, 160, 164, 240, 336, 388.2, 208.2, 301, 302, 314, 318; 264/46.4, 328.1; 74/552, 558, 558.5

[56] References Cited

U.S. PATENT DOCUMENTS

| 1,472,689 | 10/1923 | Skiles | 74/558 |
| 2,304,263 | 12/1942 | Luty | 427/208.2 |
| 3,020,661 | 2/1962 | Miller et al. | 74/552 |
| 4,465,710 | 8/1984 | Uchiyama et al. | 264/46.5 |
| 4,598,002 | 7/1986 | Kimura | 74/552 |

FOREIGN PATENT DOCUMENTS 60-94484  5/1985  Japan .

Primary Examiner—Caleb Weston
Attorney, Agent, or Firm—Cushman, Darby & Cushman

[57] ABSTRACT

A solvent tank is provided for enclosing an organic liquid solvent and an organic solvent vapor layer therein, an adhesive tank for enclosing an adhesive, a means for shifting a steering wheel metal core from the solvent tank to the adhesive tank. The steering wheel metal core is washed in the vapor of an organic solvent. Adhesive is applied to the ring part core bar of the steering wheel metal core thus washed.

4 Claims, 5 Drawing Sheets

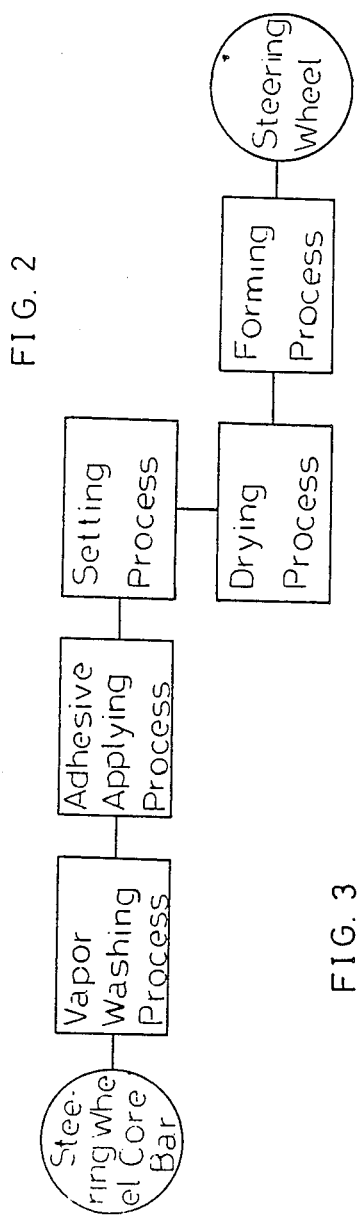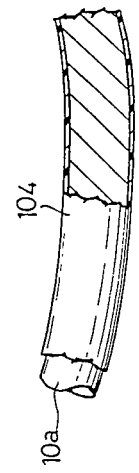

METHOD FOR MANUFACTURING A STEERING WHEEL

BACKGROUND OF THE INVENTION

1. Field of the Invention

The present invention relates to method for manufacturing a steering wheel.

2. Description of the Related Art

As shown in FIG. 11 and FIG. 12, a steering wheel 51 generally has a steering wheel metal core 52 covered with a covering material 53.

However, in case the covering material 53 put on a ring part metal core 52a of the steering wheel metal core 52 is formed of a soft material such as soft polyvinyl chloride resin or the like, the covering material 53 is capable of turning around the ring part metal core 52a in the direction indicated by an arrow 101. Thus, the feeling of grasping the steering wheel will be lost.

In view of the aforementioned situation, steps are taken such that an adhesive is applied on an outer periphery of the ring part metal core 52a to join the ring part metal core 52a and the covering material 53 together, thereby preventing the covering material 53 from turning.

However, in the steering wheel metal core 52 as manufactured of a rod or the like, since oils or other contaminants stick on the surface of the rod, the adhesive is difficult to stick on the surface of the ring part metal core 52a, which is problematical nevertheless.

Then, to prevent the covering material 53 from turning as described, there is known hitherto an art (Japanese Patent Laid-Open No. 94484/1985), wherein a hardening adhesive is applied on the ring part metal core 52a, the covering material 53 is then formed around the ring part metal core 52a, and thus the adhesive is hardened.

The art is effective in its own way, however, since the adhesive is covered with the covering material 53 on the surface, so long time is required for heating of the adhesive, and thus the manufacturing cycle for manufacturing the steering wheel is prolonged, while a heat gain necessary for reaction of the hardening adhesive cannot be given as the case may be, thus resulting in an unsatisfactory performance with the adhesive. Accordingly, the steering wheel obtained through the aforementioned art still leaves a problem that the covering material 53 is separated to be short in resistance to rotations. The problem is revealed particularly under a high temperature atmosphere standing at 60° to 80° C.

SUMMARY OF THE INVENTION

An object of the invention is to provide a method for manufacturing a steering wheel, in which a covering material is bonded securely to a steering wheel metal core and is never separated therefrom.

Another object of the invention is to provide a method for manufacturing a steering wheel whereby an adhesive is adhered firmly to the steering wheel metal core to provide a surpassing performance.

A further object of the invention is to provide a method for manufacturing a steering wheel whereby a process for heating the steering wheel is not particularly required in advance of applying the adhesive.

A still further object of the invention is to provide a method for manufacturing a steering wheel whereby evaporation of a solvent in the adhesive adhered to a ring part metal core is accelerated, and thus a bonding performance is secured quickly.

A still further object of the invention is to provide a method for manufacturing a steering wheel whereby the steering wheel metal core can be shifted from a solvent tank to an adhesive tank accurately and also within a predetermined period of time.

A still further object of the invention is to provide a method for manufacturing a steering wheel whereby the adhesive on the ring part metal core can be heated quickly, and the manufacturing cycle of the steering wheel is shortened consequently, thus enhancing the productivity.

A still further object of the invention is to provide a method for manufacturing a steering wheel whereby the adhesive on the ring part metal core is heated uniformly, and the covering material is joined evenly to the ring part metal core.

In order to attain the aforementioned objects, the invention provides a method which may be practiced using apparatus which comprises a solvent tank for enclosing an organic liquid solvent and an organic solvent vapor layer, an adhesive tank for enclosing an adhesive, a means for shifting a steering wheel metal core from the solvent tank to the adhesive tank. The method comprises a step of washing the steering wheel metal core in a steam of organic solvent, and a step of applying the adhesive to a ring part metal core of the steering wheel core bar thus washed.

Other and further objects of the invention will become apparent upon understanding of the illustrative embodiments to be described hereinbelow. Then, various advantages not particularly referred to herein will occur to one skilled in the art upon employment of the invention in practice.

BRIEF DESCRIPTION OF THE DRAWINGS

FIG. 2 is a process chart of the first embodiment;

FIG. 3 is a front view of a steering wheel metal core;

FIG. 4 is a fragmentary side view of a ring part metal core;

DETAILED DESCRIPTION OF THE PREFERRED EMBODIMENTS

A first embodiment of the invention will now be described. An apparatus relating to the invention is taken up first therefor.

Figure 1:
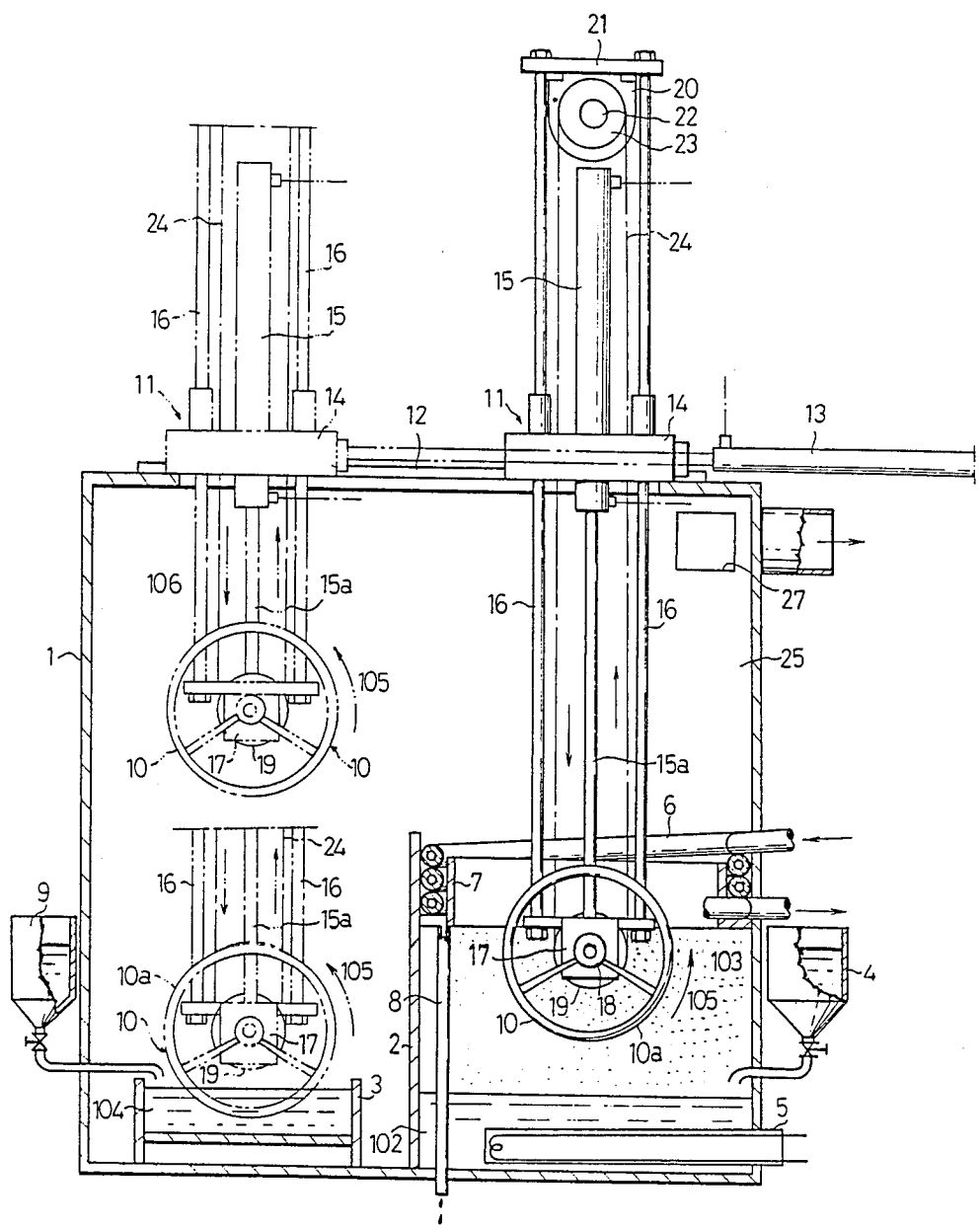
FIG. 1 is a longitudinal sectional view of apparatus for practicing a first embodiment of the invention.

As shown in FIG. 1, a solvent tank 2, open upward, and an adhesive tank 3 with a capacity smaller than that of the solvent tank 2 which is open upward are installed in parallel on a bottom portion side within a boxed frame 1.

An organic solvent 102 such as 1, 1, 1-trichloroethane or the like can be stored on a bottom portion of the solvent tank 2 in a predetermined quantity, and when the level lowers, the organic solvent 102 can be refed from a supplementary feed tank 4 installed outside the frame 1.

Then, a heater 5 for heating the organic solvent 102 to generate vapor is provided on the bottom portion. Since the vapor of the organic solvent 102 is heavier than air, a vapor layer 103 is formed on the organic solvent 102.

A condenser 6 for condensing the vapor of the organic solvent 102 is provided on an upper side wall of the solvent tank 2, and a tray 7 for receiving a drain for the condensed organic solvent 102 is provided on a lower side of the condenser 6. The water content in the air is condensed and contained in the drain. Therefore, the drain is led externally through a drain pipe 8 mounted on the tray 7 and so separated.

An adhesive 104 such as solution type polyamide group adhesive or the like can be stored in the adhesive tank 3 in a predetermined quantity, and when the level lowers, the adhesive 104 can be refed from a supplementary feed tank 9 installed outside the frame 1.

A shift means 11 for shifting a steering wheel metal core 10 supported thereon from the solvent tank 2 to the adhesive tank 3 is installed on a rail 12 provided on the frame 1.

The shift means 11 is provided at least with a baseplate 14 reciprocated horizontally by an air cylinder 13 on the rail 12, an air cylinder 15 fixed vertically to the baseplate 14 and having a piston rod 15a elongating downward, and a locking member 17 mounted on a nose portion of the piston rod 15a. Two guide bars 16 extending vertically and paralleled with each other are inserted in both side portions of the baseplate 14, and both side portions of the locking member 17 are fixed on a lower end portion thereof. A sprocket 19 for rotating a mandrel 18 locking the steering wheel metal core 10 is provided on the locking member 17.

A coupling member 21 for coupling the guide bars 16 is mounted on upper end portions thereof, and a motor 20 is fixed on a lower side of the coupling member 21.

A sprocket 23 is mounted on a rotating shaft 22 of the motor 20, a chain 24 is wound round the sprocket 23 and the sprocket 19 of the locking member 17, and thus the mandrel 18 is rotatable in the direction indicated by an arrow 105.

Then, a rear wall 25 and a front wall (not indicated) are provided on the rear side and front side of the frame 1 barring an upper portion of the adhesive tank 3. Accordingly, the steering wheel metal core 10 is drawable from the apparatus according to the embodiment, through an upper portion front side of the adhesive tank 3. Further, an exhaust port 27 is provided on an upper corner portion of the rear wall 25.

Next described is a manufacturing method for steering wheel relating to the invention by means of the above-described apparatus.

As shown in FIG. 2, the method comprises a vapor washing step for washing the steering wheel metal core 10 in the vapor of the organic solvent 102, an adhesive applying step for applying the adhesive 104 to the steering wheel metal core 10 thus washed, a setting step for unifying a film thickness of the adhesive 104 by rotating the steering wheel metal core 10 with the adhesive 104 applied thereon as above.

Further, a drying step for drying the adhesive 104 to give it an adhesive property and a forming step for covering the steering wheel metal core 10 with a covering material ensue for completing the conversion of the steering wheel metal core 10 to a steering wheel. Each of the aforementioned processes will be described concretely next.

(Vapor Washing Step)

The steering wheel metal core 10, with the radial section of a ring part metal core 10a shown in FIG. 3 circularized, is set on the locking member 17 of the shift means 11 at a position 106 over the adhesive tank 3.

Next, the steering wheel metal core 10, locked on the locking member 17, is shifted over the solvent tank 2 by the air cylinder 13. The air cylinder 15 is then actuated to lower the steering wheel metal core 10 into the solvent tank 2.

Enclosed in the solvent tank 2 is 1, 1, 1-trichloroethylene as the organic solvent 102. Then, the organic solvent 102 is heated at its boiling point, 74° C., by the heater 5, therefore vapor is generated from the organic solvent 102.

The motor 20 is started to rotate the steering wheel metal core 10 for 10 seconds to 2 minutes through the sprocket 23, the chain 24 and the sprocket 19.

Then the vapor of the organic solvent 102 having collided with the surface of the steering wheel metal core 10 is partly condensed to a liquid with high purity, flows down along the surface of the steering wheel metal core 10 to dissolve oils or other contaminants sticking on the surface, and is shaken off from the surface according to rotations of the steering wheel core bar 10. Further, the steering wheel metal core 10 is heated up to approximately temperature of the boiling point of the solvent or so at the same time.

(Adhesive Applying Step)

The steering wheel metal core 10 thus washed in the organic solvent 102 and kept warmed is lifted by the shift means 11 through the air cylinder 15, the air cylinder 13 is then actuated to shift it over the adhesive tank 3.

Further, the air cylinder 15 is actuated to shift the steering wheel metal core 10 from the set position 106 slightly into the adhesive 104 in the adhesive tank 3. Then, the steering wheel metal core 10 is rotated once or twice. The adhesive 104 is now applied to the ring part metal core 10a. Then, in the embodiment, a polyamide group adhesive obtained through dissolving polyamide in ethanol is used as the adhesive 104.

(Setting Step)

The motor 20 and the air cylinder 15 are actuated to rotate the steering wheel metal core 10 with the adhesive 104 applied thereon as far as it comes to the set position 106. In this case, the steering wheel metal core 10 is rotated at 10 to 50 rpm for 10 to 120 seconds. Then, the adhesive 104 is applied uniformly to the surface of the ring part metal core 10a and a solvent in the adhesive is evaporated, and thus the adhesive 104 is applied to the surface of the ring part metal core 10a in a uniform film thickness as shown in FIG. 4. The adhesive 104 will then bring adhesive performance into full play on the surface of the ring part metal core 10a. In case the steering wheel metal core 10 is not rotated, the film thickness of the adhesive 104 becomes uneven on the surface of the ring part metal core 10a, and the adhesive 104 is not ready for setting at a portion where the film thickness is heavy. Then, if the covering material is formed at the ensuing process as described hereinafter, while having left an unset portion 107 of the adhesive 104, the unset portion 107 will flow between the covering material and the ring part metal core 10a at the time of forming, and thus the adhesive performance will not be ensured by the adhesive 104.

(Drying Step)

The adhesive 104 having the film thickness unified during the setting step is dried moderately. Drying is carried out at room temperature to 80° C. for about 10 minutes or longer. If an effect similar to that at drying is obtainable at the time of setting, then the drying step is not always necessary. However, it is preferable that the adhesive 104 be dried subsequently to the setting step for enhancing a productivity of the setting step.

(Forming Step)

Figure 6:
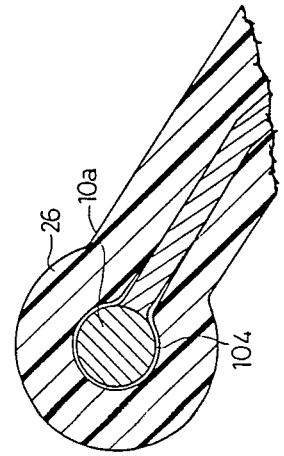
FIG. 6 is a transverse sectional view of a covering material put on the steering wheel metal core.
Figure 5:
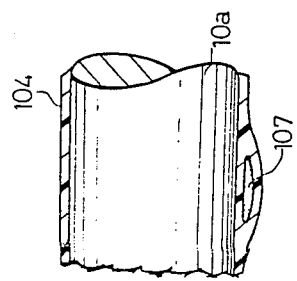
FIG. 5 is a sectional view showing a coated portion of an adhesive on the ring part metal core.

The steering wheel metal core 10 with the adhesive 104 applied on the surface is set on an insert die. Then, a soft polyvinyl chloride resin is injected into the insert die to form a covering material 26 on the surface of the ring part metal core 10a as shown in FIG. 6. Then, the ring part metal core 10a and the covering material 26 are joined together.

The function and effect of the embodiment constructed as above described will now be described. Oils or other contaminants sticking on the surface of the ring part metal core 10a are washed down by the organic solvent 102 of high purity. Thus, the adhesive 104 sticks solidly with high performance to the surface of the ring part metal core 10a.

The steering wheel metal core 10 with the adhesive 104 provided thereon is rotated. The film thickness of the adhesive 104 becomes uniform through the setting process, and then the adhesive performance is brought into full play when the covering material 26 is formed later.

Further, the adhesive 104 is dried after setting and thus the solvent is evaporated thoroughly, therefore the performance of the adhesive 104 will be brought into full play.

Then, since the vapor of the organic solvent 102 warms the steering wheel metal core 10 at the washing process, there may be secured an effect that a separate step for heating the steering wheel metal core 10 in advance of applying the adhesive 104 will not particularly be necessary.

The invention comprises shifting the steering wheel metal core 10 cleaned thoroughly by the organic solvent 102 through the washing process to the step for applying the adhesive 104 while it is kept warmed, therefore the adhesive 104 can be applied securely to the ring part metal core 10a which is kept warmed. Consequently, evaporation of the solvent in the adhesive 104 adhering to the ring part metal core 10a is accelerated, and the adhesive performance is brought quickly into full play.

Furthermore, since such means as the motor 20 and the two air cylinders 13, 15 are used for the shift means 11, the steering wheel metal core 10 can be shifted accurately from the solvent tank 2 to the adhesive tank 3 within a predetermined period of time.

The embodiment can be put into practice also in the following modes.

(1) The air cylinder 13 for shifting the baseplate 14 horizontally will be provided on the frame 1 at the back thereof. Such a construction is preferable, as the apparatus can be made compact entirely.

(2) Trichloroethylene or another chlorinated hydrocarbon will be used as the organic solvent 102.

(3) An adhesive of an epoxy group, chloroprene group, urethane group of acrylic group will be used as the adhesive 104.

Next, a second embodiment of the invention will be described with reference to FIG. 7 to FIG. 10.

Figure 8:
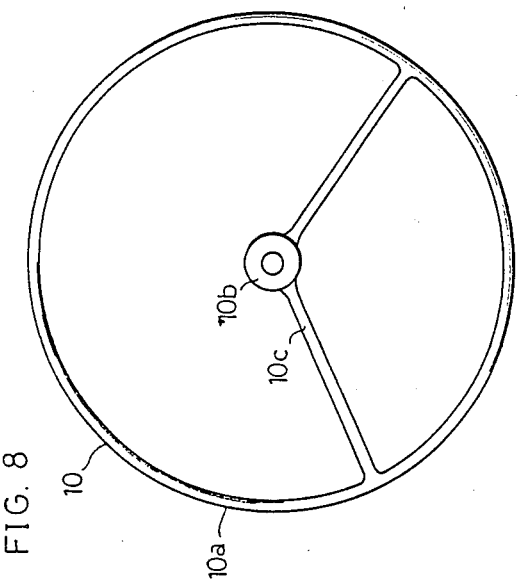
FIG. 8 is a front view of the steering wheel metal core.

In the steering wheel metal core 10 used for the embodiment, the ring part metal core 10a is supported on a two spoke metal core 10c extending outwardly of a boss part 10b, as shown in FIG. 8.

Figure 7:
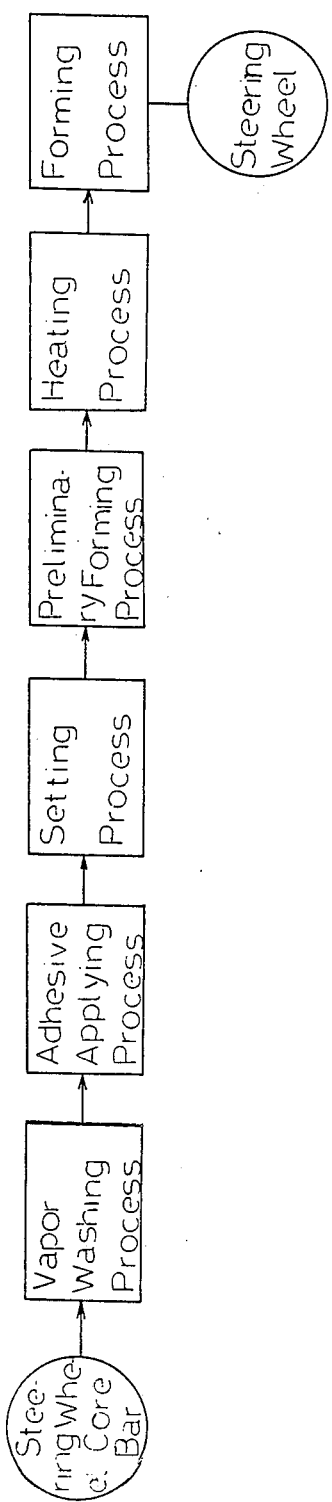
FIG. 7 is a process flow chart of a second embodiment.

The steering wheel metal core 10 is sequentially finished to become a steering wheel by way of a vapor washing step, adhesive applying step, setting step, preliminary forming step, heating step and forming step shown in FIG. 7.

(Vapor Washing Step)

Since this step is identical with the vapor washing step in the first embodiment, a description will be omitted.

(Adhesive Applying Step)

The step comprises applying the hardening type adhesive 104 to the surface of the ring part metal core 10a heated in the foregoing step as in the case of the first embodiment.

Any type of adhesive may be used as the adhesive 104, subject to being thermosetting and adhesive on evaporation of the solvent after applied in solution. Such an adhesive may be an urethane resin group adhesive, an epoxy resin group adhesive, an acrylic resin group adhesive, a polyamide group adhesive containing a setting agent and the like.

(Setting Step)

Since this step is identical with the setting step of the first embodiment, a further description will be omitted.

(Preliminary Forming Step)

The step comprises forming a lower cover on a lower side of the boss part 10b and also a covering portion on the spoke metal core 10c in advance of forming a covering material on the ring part metal core 10a, thereby forming these preliminarily almost fully into a final product.

This step may be omitted according to specifications of the steering wheel, and the lower cover and others can be formed along with a forming of the ring part metal core 10a at the forming step which will be described.

After the steering wheel metal core 10 with the adhesive 104 applied thereon is set on an insert die (not indicated), the boss part 10b and the spoke metal core 10c are subjected to an insert forming straight or through a resin insert of a predetermined shape, thereby forming the lower cover and covering the spoke metal core 10c preliminarily.

(Heating Step)

The heating step is that in which the adhesive is heated to the stage of setting and then joined to the ring part metal core 10a, and the adhesive performance of the adhesive is adjusted so as to secure a satisfactory joining property of the adhesive with the covering material in a forming step described hereinbelow.

Figure 9:
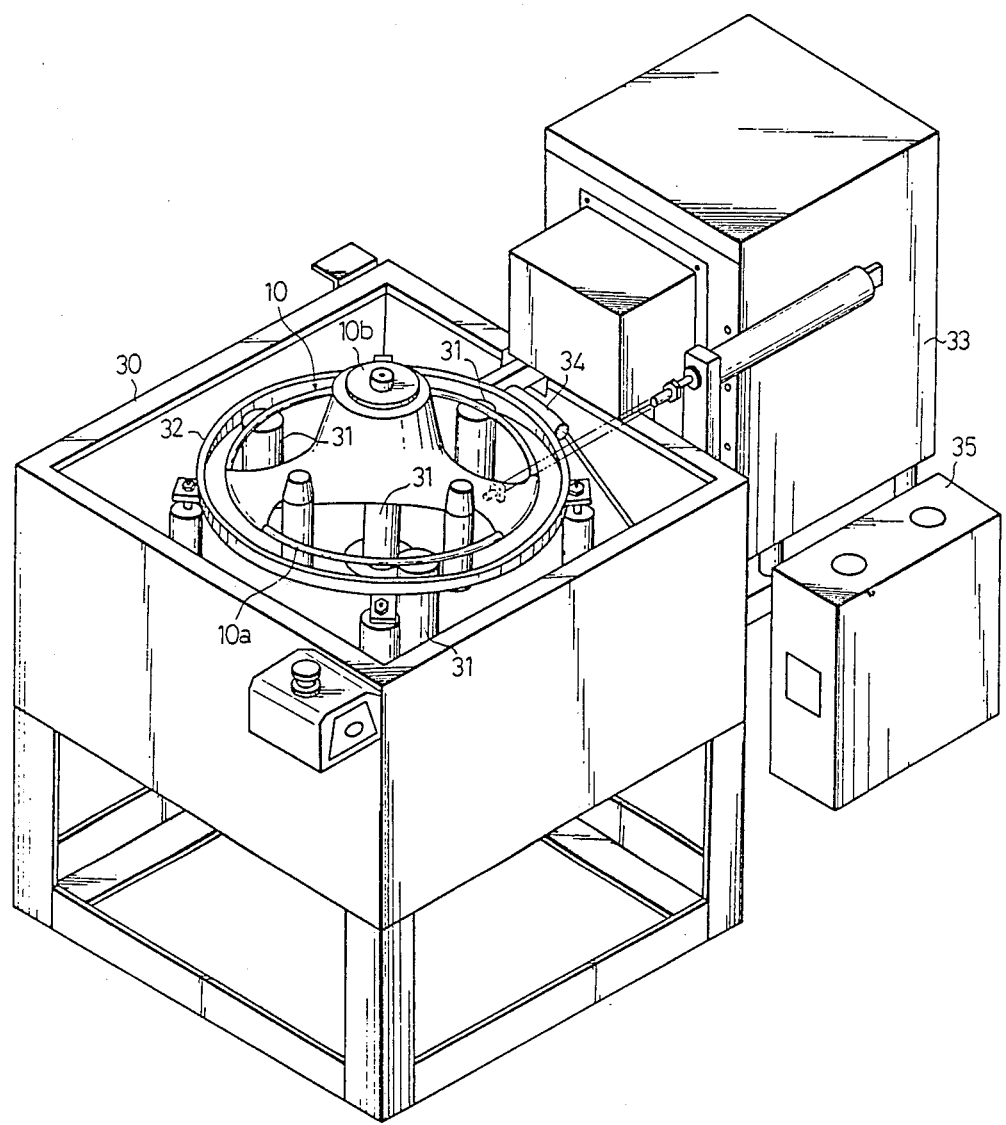
FIG. 9 is a perspective view of a heater.

As shown in FIG. 9, the steering wheel metal core 10 formed preliminarily is set horizontally on four support members 31 over a dielectric heater 30. A ringed heating member 32 is disposed around the set steering wheel metal core 10 concentrically therewith, and a coil is incorporated in the heating member 32. When a high frequency current is impressed on the coil from a high frequency generating means 33, the ring part metal core 10a and the adhesive 104 applied thereon become exothermic. The exothermic temperature of the adhesive 104 is detected by a sensor 34 provided near to the ring part metal core 10a and inputted into a controller 35. The controller 35 then controls the high frequency-generating means 33 according to a set temperature of the ring part metal core 10a which is stored beforehand.

(Forming Step)

The step comprises forming a covering material on the surface of the ring part metal core 10a.

Figure 10:
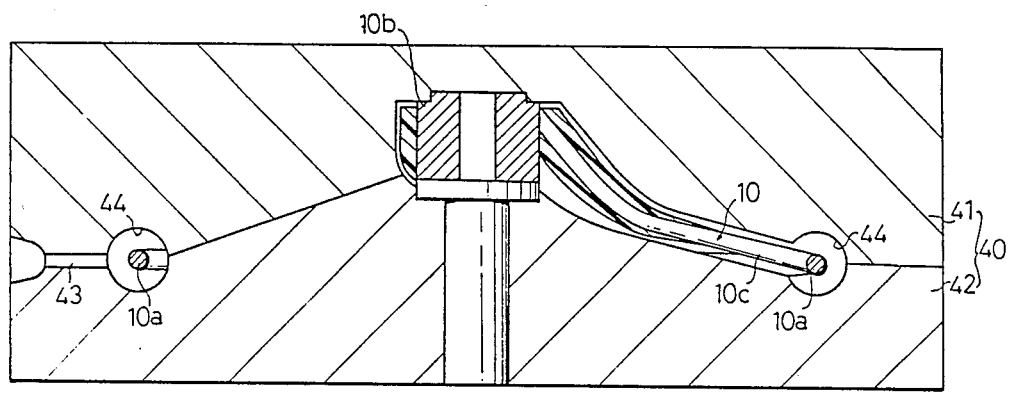
FIG. 10 is a longitudinal sectional view of an insert die.
Figure 11:
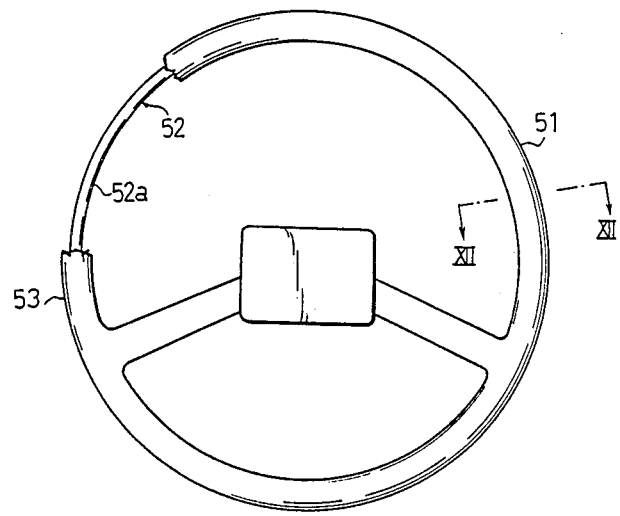
FIG. 11 is a front view, partly broken, showing a steering wheel relating to a related art.
Figure 12:
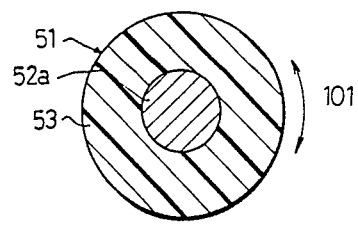
FIG. 12 is a sectional view taken on line XII—XII in FIG. 11.

The steering wheel metal core 10 with the adhesive applied thereon and kept heated is set on an insert die 40, for example, consisting of an upper die 41 and a lower die 42 shown in FIG. 10, and then a soft polyvinyl chloride resin is injected into a cavity 44 through a gate 43.

Now, as shown in FIG. 6, the covering material 26 is formed on the surface of the ring part metal core 10a, and the two are joined solidly together with the adhesive 104.

The function and effect of the embodiment constructed as above will now be described.

Since the adhesive 104 is subjected to a dielectric heating in the heating step after preliminary forming, the adhesive 104 is joined to the ring part metal core 10a by causing a setting reaction, and a satisfactory adhesive performance is displayed on the front side of the adhesive layer.

Consequently, when soft polyvinyl chloride resin is injected after the steering wheel metal core 10 is set on the insert die 40 of the forming step as warmed, the covering material 26 obtained through the forming and the adhesive 104 are joined solidly together, and thus the covering material 26 will never turn around the ring part metal core 10a. Further, quite different from the related art, the adhesive 104 on the ring part metal core 10a is subjected to a dielectric heating in the state before the covering material 26 is put on, or as exposed on the surface of the ring part metal core 10a, therefore the adhesive 104 is heated swiftly. Consequently, the manufacturing cycle of the steering wheel is shortened, and productivity can be enhanced thereby. Further, since the adhesive 104 is subjected to dielectric heating, the adhesive 104 is heated uniformly, and the covering material 26 is joined to the ring part metal core 10a evenly.

The embodiment can also be put into practice in the following modes.

(1) The steering wheel metal core 10 with the adhesive 104 applied to the ring part metal core 10a may be heated according to any selected process therefor, however, dielectric heating at high frequency will be most desirable from the viewpoint of availability for uniform and quick heating.

(2) Polyurethane resin will be used as the soft synthetic resin.

As many apparently widely different embodiments of the invention may be made without departing from the spirit and scope thereof, it is to be understood that the invention is not limited to the specific embodiments thereof except as defined in the appended claims.

What is claimed is:

1. A process for manufacturing a steering wheel comprising:
   (a) washing a metal core with a heated vapor of an organic solvent for oil, for degreasing said metal core in order to improve adherence of a selected thermosetting adhesive thereto, while transferring heat to said metal core via said heated vapor;
   (b) providing a coating of said thermosetting adhesive on said degreased metal core;
   (c) dielectrically heating said coated metal core by use of high-frequency to activate said thermosetting adhesive thereon, at an outer surface of said thermosetting adhesive;
   (d) moldingly coating a layer of soft synthetic resin onto said activated surface of said thermosetting adhesive after setting said metal core, while said metal core remains heated, in an insert die and thereby bonding the soft synthetic resin to the metal core.

2. The method of claim 1 wherein:
said soft synthetic resin is one selected from the group consisting of polyvinyl chloride resin and polyurethane resin.

3. The method of claim 1, wherein:
said organic solvent is a chlorinated hydrocarbon.

4. The method of claim 1, further comprising:
rotating said metal core circumferentially while conducting step (b) in order to cause said coating of thermosetting adhesive to become substantially uniform in thickness.

* * * * *